United States Patent
Freer

(10) Patent No.: US 12,296,941 B2
(45) Date of Patent: May 13, 2025

(54) SYSTEM AND METHOD FOR CONTROLLING A PROPULSOR FOR A HYBRID-ELECTRIC AIRCRAFT PROPULSION SYSTEM

(71) Applicant: Pratt & Whitney Canada Corp., Longueuil (CA)

(72) Inventor: Richard Freer, St-Basile-le-Grand (CA)

(73) Assignee: Pratt & Whitney Canada Corp., Longueuil (CA)

( * ) Notice: Subject to any disclaimer, the term of this patent is extended or adjusted under 35 U.S.C. 154(b) by 55 days.

(21) Appl. No.: 18/196,740

(22) Filed: May 12, 2023

(65) Prior Publication Data
US 2024/0375766 A1 Nov. 14, 2024

(51) Int. Cl.
*B64C 11/30* (2006.01)
*B64D 27/10* (2006.01)
(Continued)

(52) U.S. Cl.
CPC ............ *B64C 11/30* (2013.01); *B64D 27/10* (2013.01); *B64D 27/24* (2013.01); *B64D 31/00* (2013.01); *B64D 27/026* (2024.01)

(58) Field of Classification Search
CPC .... F02C 7/36; F02C 7/32; F02C 7/042; F02C 9/28; F05D 2270/02; F05D 2270/021; F05D 2270/022
See application file for complete search history.

(56) References Cited

U.S. PATENT DOCUMENTS

| | | | |
|---|---|---|---|
| 4,184,083 A * | 1/1980 | Takeuchi | ......... F02C 9/28 290/51 |
| 9,623,978 B2 | 4/2017 | Anton | |

(Continued)

OTHER PUBLICATIONS

EP Search Report for EP Patent Application No. 24175283.1 dated Oct. 11, 2024.

*Primary Examiner* — Thuyhang N Nguyen
(74) *Attorney, Agent, or Firm* — Getz Balich LLC

(57) ABSTRACT

An assembly for an aircraft propulsion system includes a propulsor, an engine, and electrical distribution system, and a controller. The propulsor is configured for rotation about a rotational axis. The engine includes a rotor coupled with the propulsor. The electrical distribution system includes an electric motor. The electric motor is coupled with the propulsor. The electric motor and the rotor are configured to cooperatively control rotation of the propulsor about the rotational axis by applying a total torque to the propulsor. The total torque includes a motor torque of the electric motor and an engine torque of the rotor. The controller is configured to: identify a target rotation speed for the propulsor, identify a deviation of an actual rotation speed of the propulsor from the identified target rotation speed, change a target total torque for the propulsor, control the engine to change an actual engine torque of the rotor to the target total torque, and while controlling the engine to change the actual engine torque of the rotor to the target total torque, identify a torque difference between the actual engine torque and the target total torque and control the electric motor to apply a target motor torque to the propulsor based on the torque difference.

15 Claims, 6 Drawing Sheets

(51) Int. Cl.
*B64D 27/24* (2024.01)
*B64D 31/00* (2024.01)
*B64D 27/02* (2006.01)

(56) References Cited

U.S. PATENT DOCUMENTS

| | | | |
|---|---|---|---|
| 10,040,566 B2 | 8/2018 | Waltner | |
| 10,815,905 B2* | 10/2020 | Suzuki | F02C 9/32 |
| 10,961,922 B2* | 3/2021 | Meisner | F02C 9/56 |
| 11,059,567 B2* | 7/2021 | Des Roches-Dionne | B64C 11/30 |
| 11,408,340 B2 | 8/2022 | Lefebvre | |
| 2015/0233380 A1* | 8/2015 | Sasaki | F04D 27/004 318/474 |
| 2015/0367950 A1 | 12/2015 | Rajashekara | |
| 2017/0218842 A1* | 8/2017 | Nestico | F04D 29/563 |
| 2017/0320584 A1* | 11/2017 | Menheere | F02C 3/145 |
| 2017/0350404 A1* | 12/2017 | Sasaki | F24F 11/30 |
| 2020/0124139 A1* | 4/2020 | Harvey | F02C 7/32 |
| 2020/0277073 A1 | 9/2020 | Thomassin | |
| 2021/0101691 A1 | 4/2021 | Mark | |
| 2022/0009615 A1 | 1/2022 | Mark | |

\* cited by examiner

SYSTEM AND METHOD FOR CONTROLLING A PROPULSOR FOR A HYBRID-ELECTRIC AIRCRAFT PROPULSION SYSTEM

TECHNICAL FIELD

This disclosure relates generally to hybrid-electric aircraft propulsion systems and, more particularly, to systems and methods for controlling a propulsor for a hybrid-electric aircraft propulsion system.

BACKGROUND OF THE ART

Hybrid-electric propulsion systems for aircraft may include an electric motor configured to operate with a gas turbine engine to provide thrust for an associated aircraft. For example, the electric motor and the gas turbine engine may each be configured for effecting rotation of a propulsor of the hybrid-electric propulsion system. Various systems and methods for controlling the propulsor of a hybrid-electric aircraft propulsion system are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes a propulsor, an engine, and electrical distribution system, and a controller. The propulsor is configured for rotation about a rotational axis. The engine includes a rotor coupled with the propulsor. The rotor is configured to drive rotation of the propulsor about the rotational axis. The electrical distribution system includes an electric motor. The electric motor is coupled with the propulsor. The electric motor and the rotor are configured to cooperatively control rotation of the propulsor about the rotational axis by applying a total torque to the propulsor. The total torque includes a motor torque of the electric motor and an engine torque of the rotor. The controller includes a processor in communication with a non-transitory memory storing instructions, which instructions when executed by the processor, cause the processor to: identify a target rotation speed for the propulsor, identify a deviation of an actual rotation speed of the propulsor from the identified target rotation speed while the rotor is driving rotation of the propulsor, change a target total torque for the propulsor to reduce the deviation of the actual rotation speed from the identified target rotation speed, control the engine to change an actual engine torque of the rotor to the target total torque, and while controlling the engine to change the actual engine torque of the rotor to the target total torque, identify a torque difference between the actual engine torque and the target total torque and control the electric motor to apply a target motor torque to the propulsor based on the torque difference.

In any of the aspects or embodiments described above and herein, the identified target rotation speed may include a constant target rotation speed.

In any of the aspects or embodiments described above and herein, the propulsor may be a propeller including a plurality of variable-pitch propeller blades.

In any of the aspects or embodiments described above and herein, the identified target rotation speed may include an initial target rotation speed and a final target rotation speed. The final target rotation speed may be different than the initial target rotation speed.

In any of the aspects or embodiments described above and herein, the final target rotation speed may be greater than the initial target rotation speed.

In any of the aspects or embodiments described above and herein, the instructions, when executed by the processor, may further cause the processor to: determine the target motor torque such that the target motor torque is equal to the identified torque difference. The deviation may be an undershoot. The target motor torque may be a positive torque.

In any of the aspects or embodiments described above and herein, the instructions, when executed by the processor, may further cause the processor to: determine the target motor torque such that the target motor torque is equal to the identified torque difference. The deviation may be an overshoot. The target motor torque may be a negative torque.

In any of the aspects or embodiments described above and herein, the instructions, when executed by the processor, may further cause the processor to: identify a maximum rate of power increase of the gas turbine engine, control an engine power of the gas turbine engine to increase at or below the maximum rate of power increase, and identify the deviation of the actual rotation speed of the propulsor from the identified target rotation speed as the engine power increases at or below the maximum rate of power increase.

In any of the aspects or embodiments described above and herein, the electrical distribution system may include a battery. The battery may be connected in electrical communication with the electric motor.

In any of the aspects or embodiments described above and herein, the identified target rotation speed may include a tolerance. The instructions, when executed by the processor, may further cause the processor to: identify the deviation of the actual rotation speed of the propulsor from the identified target rotation speed when the actual rotation speed is outside of a tolerance for the identified target rotation speed.

According to another aspect of the present disclosure, a method for controlling a propulsor for a hybrid-electric aircraft propulsion system includes driving the propulsor at a target total torque to rotate about a rotational axis with an engine of the hybrid-electric aircraft propulsion system, identifying a target rotation speed for the propulsor, identifying a deviation of an actual rotation speed of the propulsor from the identified target rotation speed, changing the target total torque to reduce the deviation of the of the actual rotation speed from the identified target rotation speed, controlling the engine to change an actual engine torque of the rotor to the target total torque, and controlling the propulsor by identifying a torque difference between the actual engine torque and the target total torque while controlling the engine to change the actual engine torque of the rotor to the target total torque, and controlling an electric motor to apply a target motor torque to the propulsor with the target motor torque corresponding to the identified torque difference.

In any of the aspects or embodiments described above and herein, the method may further include changing the target rotation speed and identifying the deviation of the actual rotation speed of the propulsor from the target rotation speed as the target rotation speed changes.

In any of the aspects or embodiments described above and herein, the method may further include changing the target rotation speed and controlling an engine power of the gas turbine engine based on a maximum rate of power increase as the target rotation speed changes.

In any of the aspects or embodiments described above and herein, the deviation of the actual rotation speed of the propulsor from the identified target rotation speed may be an undershoot and the target motor torque may be a positive torque.

In any of the aspects or embodiments described above and herein, the deviation of the actual rotation speed of the propulsor from the identified target rotation speed may be an undershoot and the target motor torque is a negative torque.

According to another aspect of the present disclosure, an assembly for an aircraft propulsion system includes a propulsor, a gas turbine engine, an electrical distribution system, and a controller. The propulsor is configured for rotation about a rotational axis. The gas turbine engine includes a bladed turbine rotor and a shaft connected to the bladed turbine rotor. The shaft is coupled with the propulsor. The bladed turbine rotor is configured to drive rotation of the propulsor about the rotational axis with the shaft. The electrical distribution system includes an electric motor. The electric motor and the bladed turbine rotor are configured to cooperatively control rotation of the propulsor about the rotational axis by applying a total torque to the propulsor. The total torque includes a motor torque of the electric motor and an engine torque of the bladed turbine rotor. The controller includes a processor in communication with a non-transitory memory storing instructions, which instructions when executed by the processor, cause the processor to: change a target total torque for the propulsor, control the gas turbine engine to change an actual engine torque of the bladed turbine rotor to the target total torque, and while controlling the gas turbine engine to change the actual engine torque of the bladed turbine rotor to the target total torque, identify a torque difference between the actual engine torque and the target total torque and control the electric motor to apply a target motor torque to the propulsor with the target motor torque corresponding to the identified torque difference.

In any of the aspects or embodiments described above and herein, the instructions, when executed by the processor, may further cause the processor to: identify a propulsion target parameter for the propulsor, identify a deviation of an actual propulsion parameter of the propulsor from the identified propulsion target parameter, and change the target total torque for the propulsor to reduce the deviation of the actual propulsion parameter from the identified propulsion target parameter.

In any of the aspects or embodiments described above and herein, the actual propulsion parameter may be a rotation speed of the propulsor.

In any of the aspects or embodiments described above and herein, the identified propulsion target parameter may be a constant target rotation speed for the propulsor.

In any of the aspects or embodiments described above and herein, the actual propulsion parameter may be an engine power of the gas turbine engine.

The present disclosure, and all its aspects, embodiments and advantages associated therewith will become more readily apparent in view of the detailed description provided below, including the accompanying drawings.

DETAILED DESCRIPTION

Figure 1:
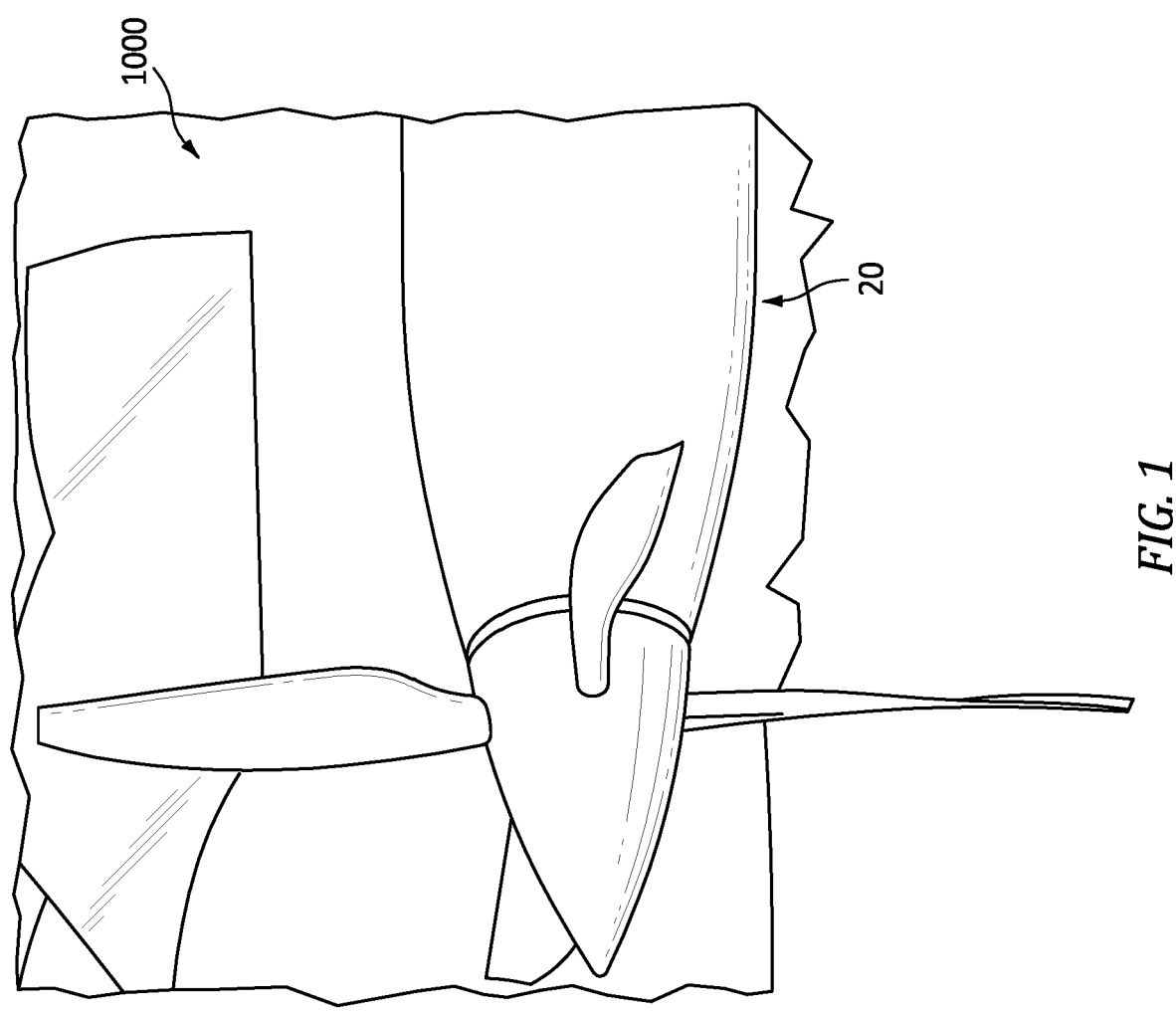
FIG. 1 illustrates a perspective view of a portion of an aircraft including a propulsion system, in accordance with one or more embodiments of the present disclosure.
Figure 2:
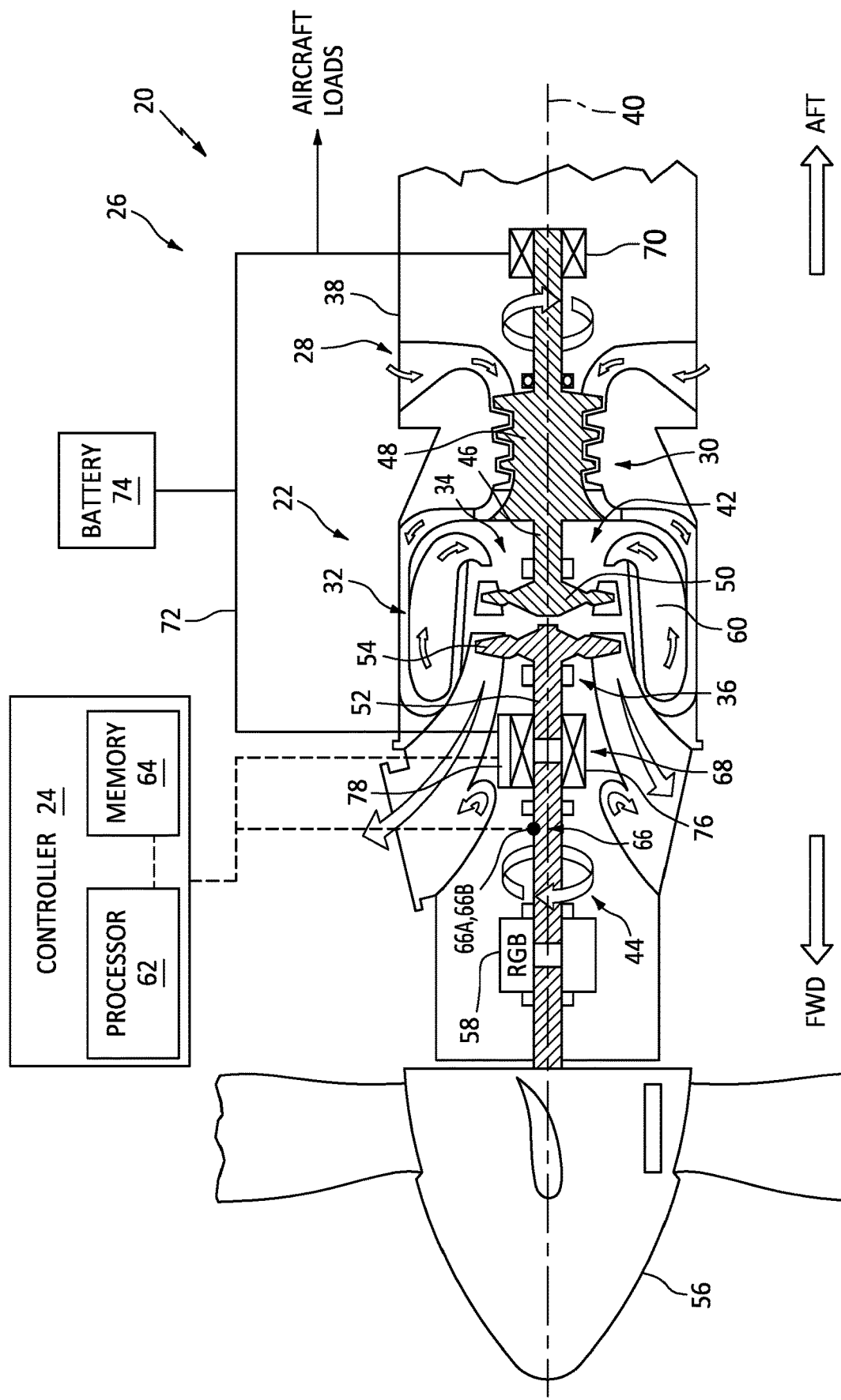
FIG. 2 schematically illustrates a side view of an aircraft propulsion system including a gas turbine engine, in accordance with one or more embodiments of the present disclosure.

FIGS. 1 and 2 illustrate a propulsion system 20 configured for an aircraft, such as the aircraft 1000 of FIG. 1. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 2 includes a gas turbine engine 22 and a controller 24. However, the present disclosure is also applicable to propulsion systems which do not include gas turbine engines such as, but not limited to, hybrid-electric propulsion systems including a rotary engine, a piston engine, a rotating detonation engine, or another type of combustion engine as well as battery-electric propulsion systems (e.g., an electric-motor driven propeller system). The propulsion system 20 additionally includes or is otherwise electrically connected to an electrical distribution system 26.

FIG. 2 illustrates a side, cutaway view of the propulsion system 20 illustrating the gas turbine engine 22. The gas turbine engine 22 of FIG. 2 is configured as a hybrid-electric, turboprop gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, an auxiliary power unit (APU), or the like.

The gas turbine engine 22 of FIG. 2 includes an air inlet 28, a compressor 30, a combustor 32, a high-pressure turbine 34, a power turbine 36, and an engine static structure 38. The air inlet 28, the compressor 30, the combustor 32, the high-pressure turbine 34, and the power turbine 36 are arranged along an axial centerline 40 (e.g., a rotational axis) of the gas turbine engine 22. The engine static structure 38 may include, for example, one or more engine cases for the gas turbine engine 22. The engine static structure 38 may additionally include cowlings, bearing assemblies, and/or other structural components of the gas turbine engine 22. The one or more engine cases form, house, and/or structurally support one or more of the air inlet 28, the compressor 30, the combustor 32, the high-pressure turbine 34, and the power turbine 36.

Components of the gas turbine engine 22, such as components of the compressor 30, the high-pressure turbine 34, and the power turbine 36, are arranged as a first rotational assembly 42 (e.g., a high-pressure spool) and a second rotational assembly 44 (e.g., a power spool). The first rotational assembly 42 and the second rotational assembly 44 are mounted for rotation about the axial centerline 40 relative to the engine static structure 38. The gas turbine engine 22 of FIG. 2 has a "free turbine" configuration in which power for aircraft propulsion is extracted by the second rotational assembly 44 downstream of (e.g., from the exhaust of) the first rotational assembly 42. The present disclosure, however, is not limited to free turbine gas turbine engine configurations.

The first rotational assembly 42 includes a first shaft 46, a bladed compressor rotor 48 for the compressor 30, and a bladed turbine rotor 50 for the high-pressure turbine 34. The first shaft 46 interconnects the bladed compressor rotor 48 and the bladed turbine rotor 50.

The second rotational assembly 44 includes a second shaft 52, a bladed power turbine rotor 54 for the power turbine 36, and a propulsor 56. The second shaft 52 (e.g., an output shaft of the gas turbine engine 22) is connected to the bladed power turbine rotor 54. The second shaft 52 may be directly or indirectly connected to the propulsor 56. For example, the second shaft 52 may be configured to rotatably drive the propulsor 56 via a reduction gear box (RGB) 58. The second rotation assembly 44 may include additional components (e.g., a propulsor input shaft) for interconnecting the second shaft 52 with the bladed power turbine rotor 54 and the propulsor 56. The RGB 58 may be configured to drive the propulsor 56 at a reduced rotational speed relative to the second shaft 52. Alternatively, the second shaft 52 may directly interconnect the bladed power turbine rotor 54 and the propulsor 56.

The propulsor 56 for the gas turbine engine 22 of FIGS. 1 and 2 is configured as a propeller for providing propulsion (e.g., thrust) for the propulsion system 20. However, the propulsor 56 of the present disclosure is not limited to propeller configurations and may alternatively be used for other propulsor configurations. Propeller configurations may include variable-pitch or fixed-pitch propeller blade configurations. For example, propeller blades for the propulsor 56 may be variable-pitch propeller blades which may each be rotatable about a lengthwise axis of the respective propeller blades to control (e.g., selectively vary) a pitch (e.g., an angle; sometimes referred to as a "beta angle") of the propeller blades. For these variable-pitch propeller blade configurations, the propulsor 56 may be controlled to maintain a constant or substantially constant rotation speed while a pitch of the propeller blades is varied to control a thrust produced by the propulsor 56. Varying a pitch of the propeller blades may correspond to a change in torque applied to the propulsor 56 while a rotation speed of the propulsor 56 remains constant or substantially constant. As previously discussed, the propeller blades for the propulsor 56 may alternatively be fixed-pitch propeller blades. For this propeller blade configuration, a rotation speed of the propulsor 56 may be varied to control a thrust produced by the propulsor 56.

During operation of the gas turbine engine 22 of FIG. 2, ambient air enters the gas turbine engine 22 through the air inlet 28 and is directed into the compressor 30. The ambient air is compressed by the bladed compressor rotor 48 and directed into a combustion chamber 60 of the combustor 32. Fuel is injected into the combustion chamber 60 and mixed with the compressed air to provide a fuel-air mixture. This fuel-air mixture is ignited, and combustion products thereof flow through and sequentially cause the bladed turbine rotor 50 and the bladed power turbine rotor 54 to rotate. The rotation of the bladed turbine rotor 50 and the bladed power turbine rotor 54 respectively drive rotation of the first rotational assembly 42 and the second rotational assembly 44. Rotation of the second rotational assembly 44 further drives rotation of the propulsor 56 to provide propulsion (e.g., thrust) for the propulsion system 20 and the aircraft 1000 (see FIG. 1). Combustion exhaust gas flowing past the bladed power turbine rotor 54 along is directed out of the gas turbine engine 22 (e.g., through an exhaust).

The controller 24 includes a processor 62 connected in signal communication with memory 64. The processor 62 may include any type of computing device, computational circuit, processor(s), CPU, computer, or the like capable of executing a series of instructions that are stored in the memory 64. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the gas turbine engine 22 and/or the electrical distribution system 26 to accomplish the same algorithmically and/or by coordination of the gas turbine engine 22 and/or the electrical distribution system 26 components. The memory 64 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 24. The controller 24 may include, or may be in communication with, an input device that enables a user to enter data and/or instructions, and may include, or be in communication with, an output device configured, for example to display information (e.g., a visual display or a printer), or to transfer data, etc. Communications between the controller 24 and other electrical and/or electronic components (e.g., controllers, sensors, etc.) may be via a hardwire connection or via a wireless connection. A person of skill in the art will recognize that portions of the controller 24 may assume various forms (e.g., digital signal processor, analog device, etc.) capable of performing the functions described herein.

The controller 24 may form or otherwise be part of an electronic engine controller (EEC) for the gas turbine engine 22. The EEC may control operating parameters of the gas turbine engine 22 including, but not limited to, fuel flow, stator vane position (e.g., variable compressor inlet guide vane (IGV) position), compressor air bleed valve position, shaft (e.g., first shaft 46 and/or second shaft 52) torque and/or rotation speed, etc. so as to control an engine power and/or thrust of the gas turbine engine 22. In some embodiments, the EEC may be part of a full authority digital engine control (FADEC) system for the propulsion system 20. However, the present disclosure is not limited to the controller 24 being formed by or otherwise part of an EEC, a FADEC system, or another electronic control system of the propulsion system 20 and/or the aircraft 1000 (e.g., an avionics system).

The controller 24 is connected in communication (e.g., electronic signal communication) with one or more sensors 66. The controller 24 is configured to receive signals from the one or more sensors 66 to perform the controller 24 functions described herein. The one or more sensors 66 may include a shaft rotation speed sensor 66A and/or a shaft torque sensor 66B. The one or more sensors 66 may additionally include sensors such as, but not limited to, temperature sensors, pressure sensors, accelerometers, fuel flow sensors, propeller blade pitch sensors, and the like. The shaft rotation speed sensor 66A and the shaft torque sensor 66B of FIG. 2 are positioned and configured to measure a rotation speed and a torque, respectively, of the second shaft 52.

The electrical distribution system 26 of FIG. 2 is configured to supply electrical power for electrical loads of the propulsion system 20 and/or the aircraft 1000 (see FIG. 1). Examples of electrical loads for the aircraft 1000 include, but are not limited to, electronic control systems, environmental control systems, electric motors, lighting systems, communication systems, and the like. The electrical distribution system 26 of FIG. 2 includes an electric motor assembly 68, an electrical distribution bus 72, and a battery 74. The electrical distribution system 26 may further include a generator 70. The present disclosure, however, is not limited to the particular configuration of the electrical distribution system 26 of FIG. 2. The electrical distribution system 26 may include additional electrical components such as, but not limited to, breaker, contactors, transformers, alternating current (AC) to direct current (DC) conversion components, DC to AC conversation components, and the like to effect operation of the electrical distribution system 26 to supply electrical power to the electrical loads of the propulsion system 20 and/or the aircraft 1000.

The electric motor assembly 68 of FIG. 2 includes an electric motor 76 and an inverter 78. The electric motor 76 is electrically connected to the electrical distribution bus 72 and configured to receive electrical power from the electrical distribution bus 72 for operation of the electric motor 76. The electric motor 76 is configured to apply a rotational force to second rotational assembly 44. For example, the electric motor 76 may be directly or indirectly coupled to the second shaft 52 to drive the second shaft 52 by applying a rotational force to the second shaft 52. The electric motor 76 of FIG. 2 is illustrated in direct contact with the second shaft 52, however, the present disclosure is not limited to the exemplary configuration of the electric motor 76 of FIG. 2. For example, the electric motor 76 may be indirectly connected to the second shaft 52 by a gear box. The electric motor 76 may include a clutch configured to selectively couple the electric motor 76 to the second shaft 52 or to an intermediate component of the second rotational assembly 44. Accordingly, the electric motor 76 may be configured to apply a rotational force to the second rotational assembly 44 to facilitate rotation of the propulsor 56 by the second rotational assembly 44. For example, the electric motor 76 in combination with the bladed power turbine rotor 54 may provide the rotational force for driving the propulsor 56. The electric motor 76 may also be configured to operate as an electrical generator driven by rotation of the second shaft 52. Accordingly, the electric motor 76 may also operate as a rotational load on the second shaft 52, thereby slowing a rotation of the second shaft 52 and/or generating electrical power which may be directed to the battery 74. The electric motor 76 may be selected to be sufficiently powerful to drive the propulsor 56 during all flight conditions independent of the bladed power turbine rotor 54. Accordingly, the electric motor 76 may provide all of the rotational force for driving the propulsor 56.

The inverter 78 is electrically connected between the electric motor 76 and the electrical distribution bus 72. The is configured to control (e.g., regulate) the electrical power (e.g., AC voltage and/or frequency) supplied to the electric motor 76 from the electrical distribution bus 72. The inverter 78 may be configured to measure or otherwise determine a rotation speed and/or a torque of the electric motor 76 (e.g., a rotor of the electric motor 76). By controlling the electrical power supplied to the electric motor 76, the inverter 78 may control the electric motor 76 to operate at a controlled rotation speed and/or torque. For example, the inverter 78 may control the electric motor 76 to apply a positive torque, a negative torque (e.g., the electric motor 76 operating as a generator or rotational load), or no torque to the second shaft 52. The inverter 78 may include one or more sensors configured to measure a rotation speed and/or torque of the electric motor 76. The inverter 78 may be connected in signal communication with the controller 24 and may be controlled by the controller 24 to control the rotation speed and/or torque of the electric motor 76. Alternatively, the inverter 78 may include an electronic control system similar to that described above for the controller 24. For example, the inverter 78 may include a processor connected in signal communication with a non-transitory memory storing instructions, which instructions when executed by the processor, cause the inverter and/or its processor to control a rotation speed and/or torque of the electric motor 76. The inverter 78 may alternatively include the controller 24, with the controller 24 directing functions of the inverter 78 for controlling a rotation speed and/or torque of the electric motor 76. The inverter 78 of the present disclosure, however, is not limited to any particular configuration, relationship with the controller 24, or electronic control architecture.

The generator 70 may be configured to supply electrical power to the electrical distribution system 26. The generator 70 of FIG. 2, for example, is operably coupled to the first shaft 46. The generator 70 may be operably coupled to the first shaft 46 by an accessory gear box (not shown) or other speed-reducing gear assembly. The first shaft 46 drives rotation of the generator 70 to generate electrical power for the electrical distribution system 26. The generator 70 is connected in electrical communication with the electrical distribution bus 72 to supply electrical power to the electrical distribution bus 72 for electrical loads of the propulsion system 20 and/or the aircraft 1000 (see FIG. 1). The present disclosure is not limited to the particular generator 70 configuration of FIG. 2. For example, the generator 70 may alternatively be operably coupled to and driven by the second shaft 52. Moreover, electrical power for the electrical distribution system 26 may additionally or alternatively be provided by other electrical power sources which are independent of the propulsion system 20 such as, but not limited to, a generator of another propulsion system (e.g., for multi-propulsion-system aircraft), an auxiliary power unit (APU), a fuel cell (e.g., hydrogen fuel cell) assembly, or another power source disposed on the aircraft 1000 or otherwise outside of the propulsion system 20, and/or a ground-based power supply (e.g., an airport electrical distribution system, generator, or other electrical power supply or battery charging device) external to the aircraft 1000.

The battery 74 is configured to selectively supply electrical power to the electrical distribution bus 72 independently (e.g., as a single power source for the electrical distribution bus 72) or in combination with the generator 70 and/or other power sources. The battery 74 may be disposed, for example, in the aircraft 1000 and/or its propulsion systems 20. The battery 74 may include a plurality of battery modules (e.g., battery packs), battery cells, and/or the like electrically connected together in series and/or parallel as necessary to configure the battery 74 with the desired electrical characteristics (e.g., voltage output, current output, storage capacity, etc.). The present disclosure is not limited to any particular configuration of the battery 74. The battery 74 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like.

For aircraft propulsion systems, such as those including gas turbine engines, the gas turbine engine may control a rotation speed of the propulsor (e.g., a propeller). For example, the gas turbine engine may control the propulsor speed (NR) to maintain the propulsor speed at or close to a target propulsor speed. An EEC or other electronic control system may control a fuel flow rate, propeller blade pitch, or other operational characteristic of the gas turbine engine to maintain the propulsor speed at or close to a target propulsor speed. However, the governing capability of the gas turbine engine and its control system for maintaining the propulsor speed may be influenced by a number of factors such as, but not limited to, a rate of change of propulsor loading (e.g., as determined by pilot action to adjust propeller blade pitch, helicopter attitude, etc.), gas turbine engine operating limits (e.g., compressor surge limits, temperature limits, minimum fuel flow limits, minimum and maximum compressor speed limits, etc.), control system gains (e.g., how quickly the control system may adjust to changes in propulsor speed, the use of control system anticipation signals (e.g., signals directed to the control system in advance of a propulsor load change to minimize propulsor speed deviations from a target propulsor speed, etc.), and the like. Factors, such as those previously discussed, may cause the propulsor speed to deviate from the target propulsor speed, particularly during propulsor loading transient conditions resulting in or requiring acceleration or deceleration of the propulsor. In some cases, propulsor speed deviations of five to ten percent from the target propulsor speed may occur. Conditions in which the propulsor speed exceeds the propulsor target speed may be referred to herein as "overshoot." Conditions in which the propulsor speed decreases below the propulsor target speed may be referred to herein as "undershoot."

Figure 4:
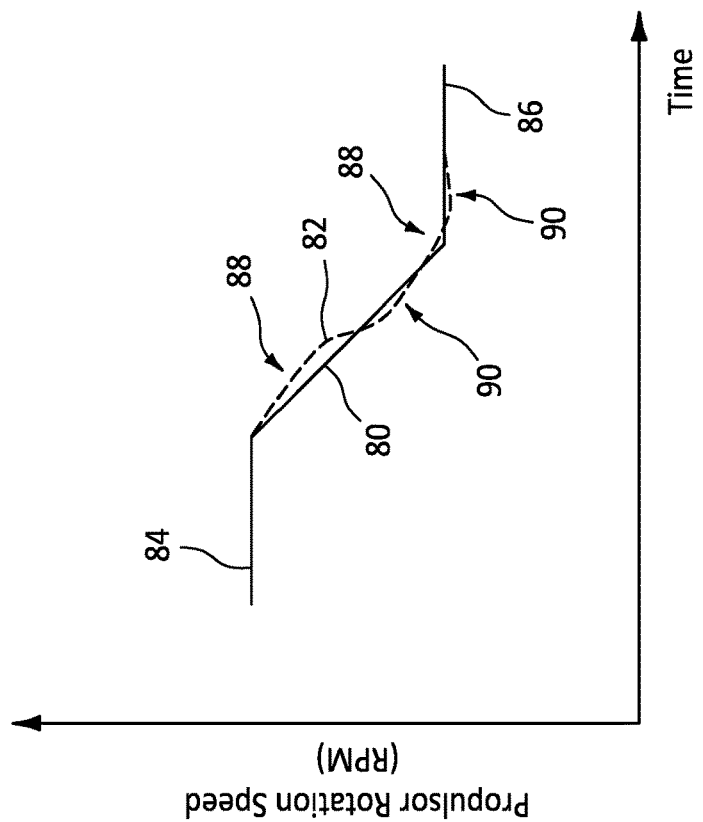
FIG. 4 illustrates a graph depicting a deceleration transient for aircraft propulsion system, in accordance with one or more embodiments of the present disclosure.
Figure 3:
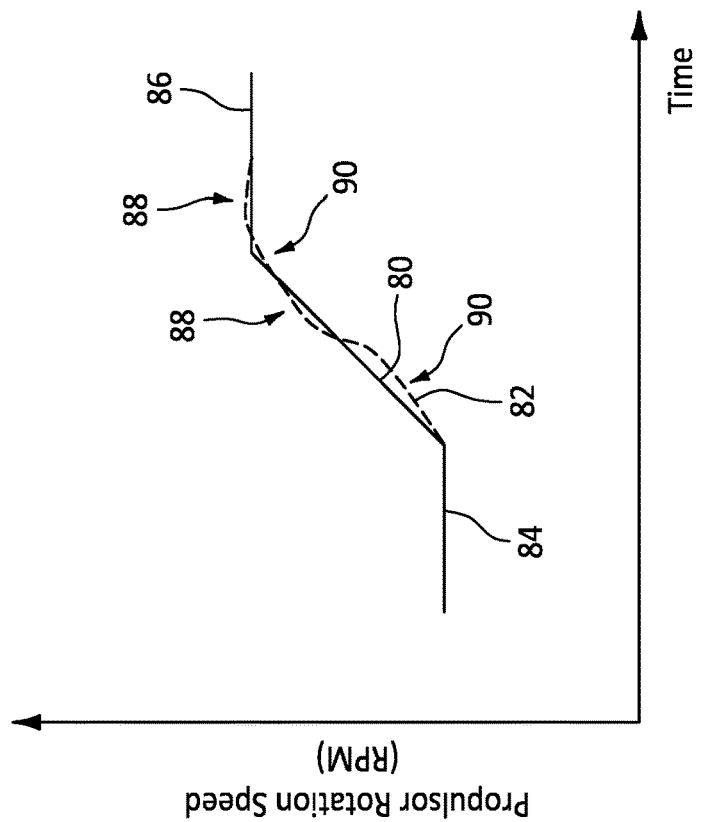
FIG. 3 illustrates a graph depicting an acceleration transient for an aircraft propulsion system, in accordance with one or more embodiments of the present disclosure.

FIGS. 3 and 4 illustrate exemplary transient propulsion condition for a propulsor speed transient for a propulsor driven by a gas turbine engine (e.g., only by a gas turbine engine). FIG. 3 illustrates a target propulsor speed 80 for an acceleration transient in which the target propulsor speed 80 increases over a period of time. The target propulsor speed 80 may be selected, for example, by a controller and/or pilot to increase an actual propulsor speed 82 of the propulsor. The target propulsor speed 80 of FIG. 3 includes an initial target value 84 and a final target value 86 greater than the initial target value 84. The target propulsor speed 80 may gradually increase (e.g., ramp) from the initial target value 84 to the final target value 86. As shown in FIG. 3, the actual propulsor speed 82 of the propulsor may generally follow the target propulsor speed 80, however, the actual propulsor speed 82 may deviate from the target propulsor speed 80 during portions of the acceleration transient. For example, the actual propulsor speed 82 may exhibit one or more overshoots 88 and/or one or more undershoots 90 relative to the target propulsor speed 80 of the propulsor. FIG. 4 illustrates a target propulsor speed 80 for a deceleration transient in which the target propulsor speed 80 decreases over a period of time. The target propulsor speed 80 of FIG. 4 includes the initial target value 84 and the final target value 86, which final target value 86 is less than the initial target value 84. The target propulsor speed 80 may gradually decrease (e.g., ramp) from the initial target value 84 to the final target value 86. Similar to the acceleration transient of FIG. 3, the actual propulsor speed 82 of FIG. 4 may exhibit one or more overshoots 88 and/or one or more undershoots 90 relative to the target propulsor speed 80.

Figure 5:
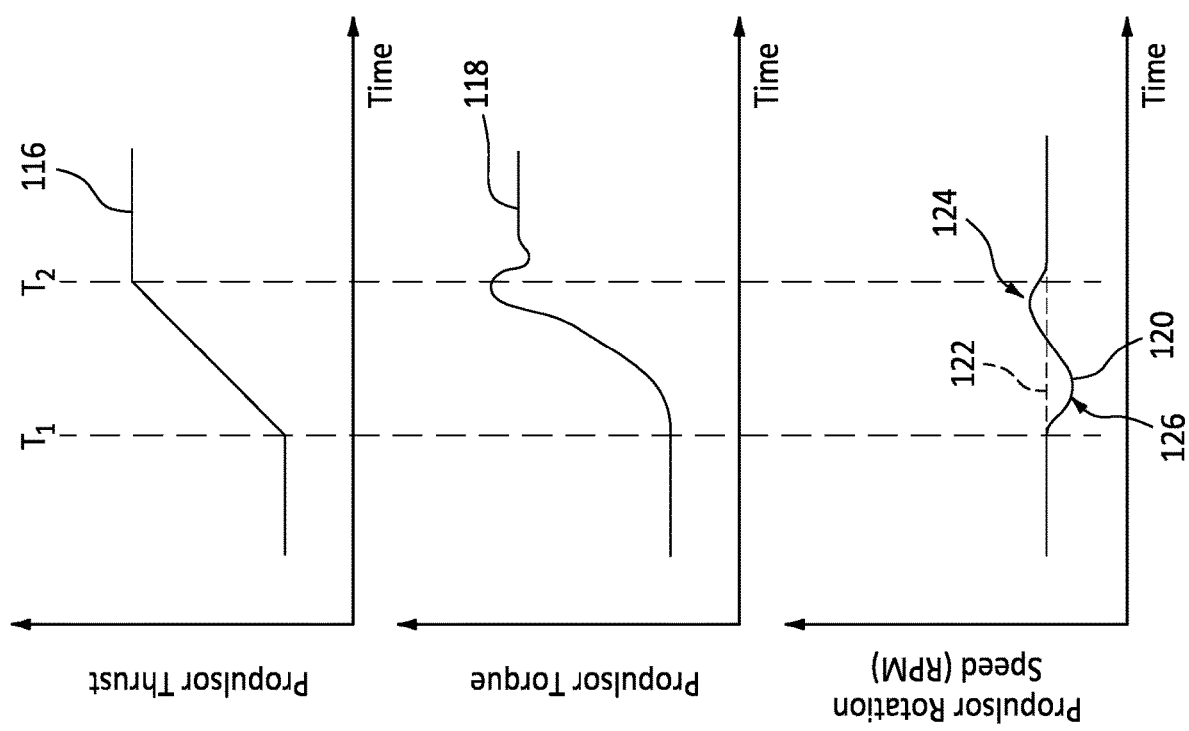
FIG. 5 illustrates graphs depicting another acceleration transient for an aircraft propulsion system, in accordance with one or more embodiments of the present disclosure.

FIG. 5 illustrates another exemplary transient propulsion condition for a propulsor driven by a gas turbine engine (e.g., only by a gas turbine engine). The propulsor represented in FIG. 5 may be understood to be controlled using a constant-speed control system, for example, in which the propulsor includes variable-pitch blades to control a thrust of the propulsor while a rotation speed of the propulsor remains constant or substantially constant. FIG. 5 illustrates an exemplary transient propulsion condition in which a propulsor thrust 116 generated by the propulsor is increased from a first thrust value at time T1 to a second higher thrust value at time T2. In response to the increased thrust demand, the represented gas turbine engine may be controlled to increase a propulsor torque 118 applied to the propulsor by the gas turbine engine. As previously discussed, responsiveness of the gas turbine engine to the increased thrust demand (e.g., based on the governing capability of the gas turbine engine) may cause an actual propulsor speed 120 of the propulsor to deviate from a target rotation speed 122 of the propulsor (e.g., a constant rotation speed for the propulsor of FIG. 5). For example, the actual propulsor speed 120 may exhibit one or more overshoots 124 and/or one or more undershoots 126 relative to the target propulsor speed 80.

Figure 6:
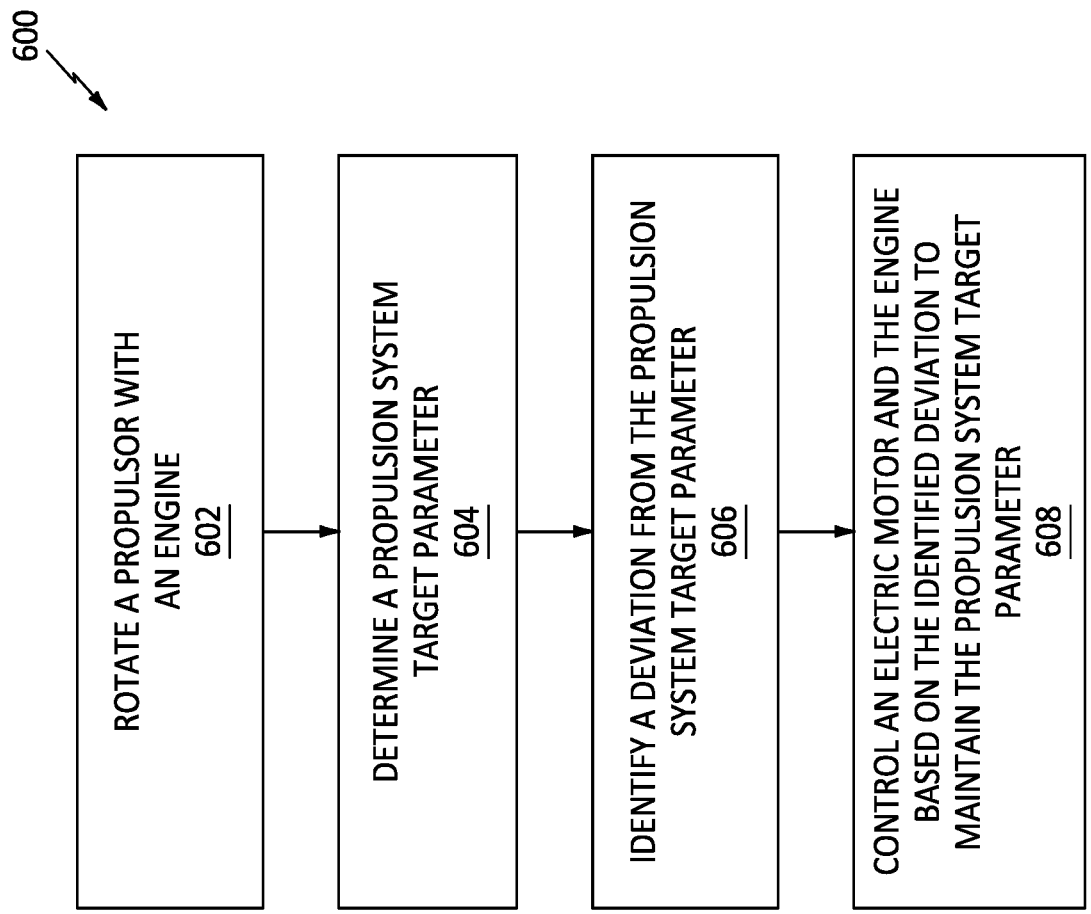
FIG. 6 illustrates a block diagram depicting a method for controlling a propulsor for an aircraft propulsion system, in accordance with one or more embodiments of the present disclosure.

Referring to FIGS. 2 and 6, a Method 600 for controlling a propulsor for a hybrid-electric aircraft propulsion system is provided. FIG. 6 illustrates a flowchart for the Method 600. The Method 600 may be performed for the propulsion system 20, as described herein. The controller 24 and/or the inverter 78 may be used to execute or control one or more steps of the Method 600 for the propulsion system 20. For example, the processor 62 may execute instructions stored in memory 64, thereby causing the controller 24 and/or the inverter 78 to execute or otherwise control one or more steps of the Method 600. However, it should be understood that the Method 600 is not limited to use with the propulsion system 20, the controller 24, and/or the inverter 78 described herein. Unless otherwise noted herein, it should be understood that the steps of Method 600 are not required to be performed in the specific sequence in which they are discussed below and, in some embodiments, the steps of Method 600 may be performed separately or simultaneously.

Step 602 includes driving (e.g., rotating) the propulsor 56 with the gas turbine engine 22 (e.g., the bladed power turbine rotor 54). For example, the gas turbine engine 22 may drive the propulsor 56 (e.g., a propeller) to provide thrust for the aircraft 1000 (see FIG. 1).

Step 604 includes determining or obtaining a propulsion target parameter for control of the propulsor 56 and/or the gas turbine engine 22. The propulsion target parameter may include, but is not limited to, a target propulsor 56 speed, a target total torque applied to the propulsor 56, and/or a target engine power (e.g., shaft horsepower (SHP) as a function of the propulsor 56 rotation speed and the total torque). The total torque may be understood as the total torque applied to the propulsor 56 (e.g., a motor torque applied by the electric motor 76 and an engine torque applied by the bladed power turbine rotor 54). The controller 24 may determine the propulsion target parameter, for example, to achieve or maintain a selected propulsor speed and/or to observe one or more gas turbine engine 22 operational limits such as, but not limited to minimum fuel flow limits minimum and maximum compressor speed limits, and the like. Alternatively, the controller 24 may obtain the propulsion target parameter from a pilot for the aircraft 1000 (see FIG. 1) and/or one or more other control systems of the aircraft 1000 or its propulsion system 20. The propulsion target parameter may be a steady state or a transient parameter. For example, a value of the propulsion target parameter may change over a period of time to facilitate execution of a transient propulsion condition (e.g., acceleration, deceleration, takeoff, landing, low noise or high speed flight, etc.) for the propulsor 56. The controller 24 may control the gas turbine engine 22 to drive the propulsor 56 consistent with the propulsion target parameter. For example, the controller 24 may control the gas turbine engine to drive the propulsor 56 at the target propulsor 56 speed, the target total torque, or the target engine power. For further example, the controller 24 may control the gas turbine engine 22 to increase or decrease a rotation speed or a torque of the bladed power turbine rotor 54 (e.g., an engine torque) (e.g., by increasing or decreasing a fuel flow rate to the combustion chamber 60).

Step 606 includes identifying a deviation of an actual propulsion parameter from the propulsion target parameter. Similar to the propulsion target parameter, the actual propulsion parameter may include, but is not limited to, an actual propulsor 56 speed, an actual total torque applied to the propulsor 56, and/or an actual engine power. For example, the controller 24 may identify a deviation of the actual propulsion parameter from the propulsion target parameter while the gas turbine engine 22 is driving rotation of the propulsor 56. Identifying the deviation may include identifying a magnitude of the deviation (e.g., a difference between the actual propulsion parameter and the propulsion target parameter). Step 606 may include measuring and/or determining the actual propulsion parameter, for example, using the sensors 66 and/or a sensor of the inverter 78. A deviation of the actual propulsion parameter from the propulsion target parameter may be identified (e.g., by the controller 24) by comparing the actual propulsion parameter to the propulsion target parameter. For example, identification of the actual propulsion parameter outside of a tolerance may cause the controller 24 to identify a deviation of the actual propulsion parameter from the propulsion target parameter.

Step 608 includes controlling the electric motor 76 to operate to maintain the propulsion parameter at the propulsion target parameter. For example, the controller 24 and/or the inverter 78 may control the electric motor 76 to operate to prevent, eliminate, control, and/or reduce a deviation of the propulsion parameter from the propulsion target parameter. In other words, the controller 24 and/or the inverter 78 may control the gas turbine engine 22 and the electric motor 76 to cooperatively control rotation of the propulsor 56 while maintaining the propulsion parameter at the propulsion target parameter or reducing a deviation of the propulsion parameter from the propulsion target parameter. The controller 24 and/or the inverter 78 may control the electric motor 76 based on a magnitude of an identified deviation between the propulsion parameter 100 and the propulsion target parameter 92. The controller 24 may change the target total torque for the propulsor 56 to reduce the deviation of the propulsion parameter from the propulsion target parameter. For example, the controller 24 may identify a new target total torque for the propulsor 56 based on the magnitude of the deviation of the propulsion parameter from the propulsion target parameter. The controller 24 may execute a control loop for the target total torque by continuously updating the target total torque to reduce the deviation of the propulsion parameter from the propulsion target parameter.

The controller 24 may control the actual engine torque of the gas turbine engine 22 by changing a target engine torque for the gas turbine engine 22 to the target total torque (e.g., such that the target engine torque is equal to the target total torque). As previously discussed, responsiveness of the gas turbine engine 22 to changes in engine torque and/or engine power may be influenced by a number of factors. Accordingly, while controlling the actual engine torque of the gas turbine engine 22 (e.g., the bladed power turbine rotor 54) to change (e.g., increase or decrease) to the target engine torque, and hence the target total torque, the controller 24 may also identify a torque difference between the actual engine torque and the target total torque. The controller 24 and/or the inverter 78 may control the electric motor 76 to apply a target motor torque to the propulsor 56 (e.g., to the second shaft 52) with the target motor torque corresponding to the difference between the actual engine torque and the target total torque. For example, the controller 24 and/or the inverter 78 may determine a target motor torque for the electric motor 76 based on the magnitude of the identified difference between the actual engine torque and the target total torque. The controller 24 and/or the inverter 78 may control the electric motor 76 to apply the target motor torque (e.g., a positive torque or a negative torque) to the propulsor 56 (e.g., to the second shaft 52).

The gas turbine engine 22 may be understood to have a maximum rate of power change (e.g., increase or decrease). The maximum rate of power change for the gas turbine engine 22 may be determined by the controller 24, for example, based on observation of gas turbine engine 22 limiting parameters (e.g., compressor surge limits, temperature limits, maximum compressor speed limits, etc.) and/or other gas turbine engine operational considerations. The maximum rate of power change for the gas turbine engine 22 may be a fixed rate value or a variable rate value which value may be determined by the controller 24 using look-up tables, engine control algorithms, or the like. The controller 24 may control the gas turbine engine 22 to operate within this maximum rate of power change, for example, during a transient propulsion condition. The maximum rate of power change may cause or contribute to the deviation 102, 104 of the actual propulsion parameter 100 from the propulsion target parameter 92. The controller 24 may control the gas turbine engine 22 to operate at a target engine power. The target engine power may be set manually by a pilot or other operator for the aircraft 1000 (see FIG. 1). For example, the controller 24 may obtain the target engine power from a pilot for the aircraft 1000.

Figure 7:
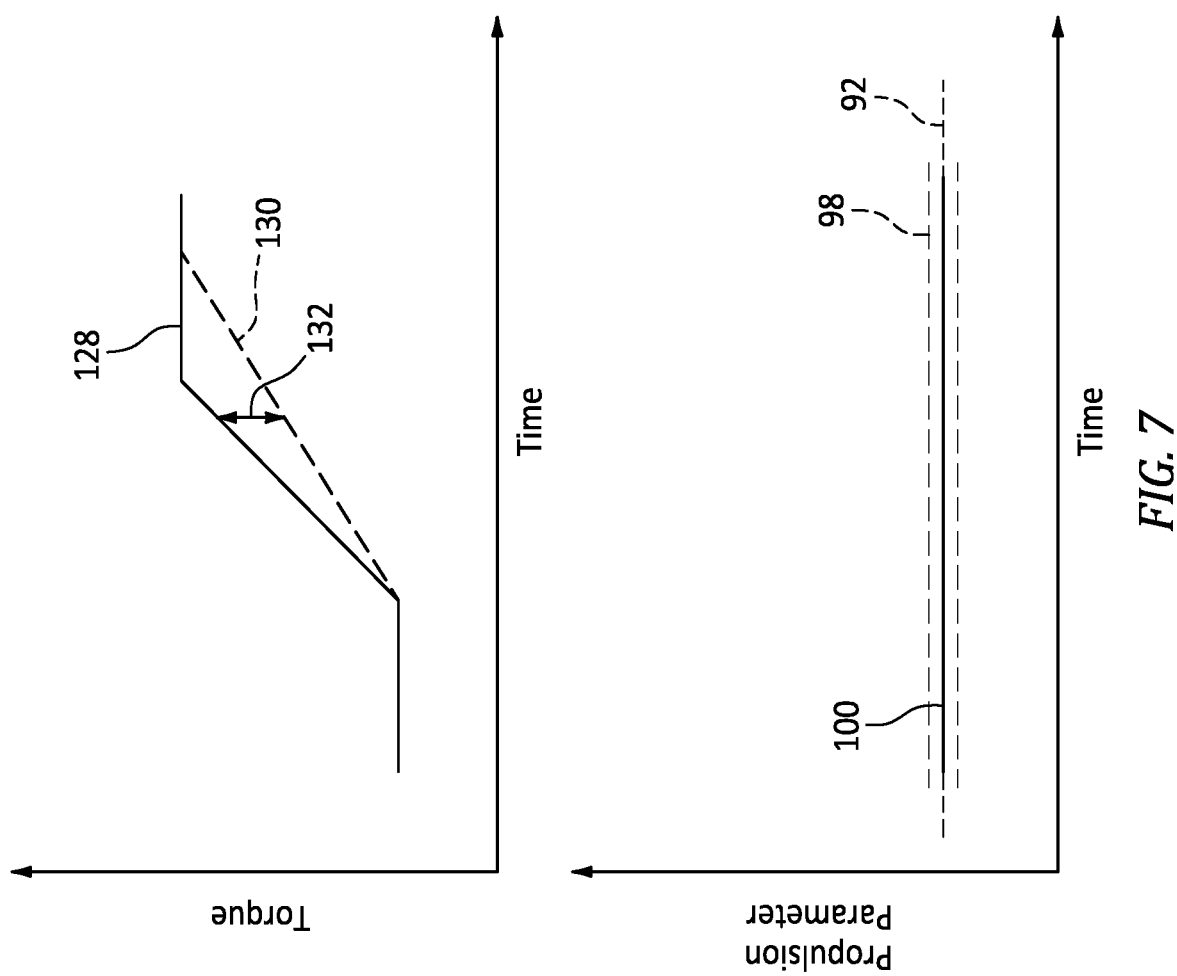
FIG. 7 illustrates a graph depicting an acceleration transient for an aircraft propulsion system, in accordance with one or more embodiments of the present disclosure.

FIG. 7 illustrates an exemplary application of the above-discussed steps of the Method 600 for a transient propulsion condition. FIG. 7 illustrates a propulsion target parameter 92 for the propulsion system 20 during the transient propulsion condition. The propulsion target parameter 92 of FIG. 7 is a target propulsor speed (NR) (e.g., rotation speed) for the propulsor 56. The propulsion target parameter 92 of FIG. 7 is representative of the propulsor 56 having a variable-pitch propeller configuration in which the propulsion target parameter 92 (e.g., the target propulsor speed (NR)) remains constant. The propulsion target parameter 92 includes a tolerance 98 (e.g., minimum and maximum tolerance values for the propulsion target parameter 92). FIG. 7 further illustrates an actual propulsion parameter 100 for the transient propulsion condition. For the transient propulsion condition of FIG. 7, the controller 24 may control the propulsor 56 (e.g., variable-pitch propeller blades of the propulsor 56) to increase a thrust provided by the propulsor 56 (e.g., an acceleration transient), thereby increasing the rotational load of the propulsor 56 on the gas turbine engine 22 and/or the electric motor 76 and causing a decrease in the actual propulsion parameter 100 (e.g., the propulsor 56 rotation speed) relative to the propulsion target parameter 92. The controller 24 may identify this deviation of the actual propulsion parameter 100 from the propulsion target parameter 92 (e.g., outside of the tolerance 98) and, to facilitate maintaining the actual propulsion parameter 100 at the substantially constant propulsion target parameter 92, the controller 24 may increase a target total torque 128 for the propulsor 56 and control the gas turbine engine 22 to increase an actual engine torque 130 of the gas turbine engine 22 to be equal to or substantially equal to the target total torque 128. While controlling the gas turbine engine 22 to change the actual engine torque 130 to the target total torque 128, the controller 24 may further identify a torque difference between the actual engine torque 130 and the target total torque 128. The controller 24 and/or the inverter 78 may control the electric motor 76 to apply a target motor torque 132 to the propulsor 56 (e.g., to the second shaft 52) to reduce a difference between the actual total torque (e.g., the actual engine torque and the actual motor torque) and the target total torque. For example, the target motor torque 132 may be based on a magnitude of the torque difference between the actual engine torque 130 and the target total torque 128. The target motor torque 132 may correspond to (e.g., be equal to or substantially equal to) the torque different between the actual engine torque 130 and the target total torque 128.

As described herein, an electric motor may be controlled to prevent or reduce deviations in propulsion target parameters during operation of an aircraft propulsion system, such as the aircraft propulsion system 20. The relatively fast responsiveness (e.g., rapid torque control) of an electric motor for controlling propulsor operation, in comparison to a gas turbine engine, facilitates the use of the electric motor in combination with the gas turbine engine to control the propulsor while preventing or reducing unintended propulsor speed variations. For example, preventing or reducing propulsor overshoot conditions may facilitate greater propulsor rotation speed for a given gas turbine engine torque rating, improved propulsion system power capability, and/or improved aircraft payload capacity (e.g., where payload capacity may be limited by propulsor autorotation performance. Preventing or reducing propulsor overshoot conditions may also facilitate reductions in pilot workload, as the risk of propulsor overspeed may be reduced. Preventing or reducing propulsor undershoot conditions may facilitate improved propulsion system responsiveness, for example, by providing target thrust more rapidly (e.g., more rapid transition from an initial target rotation speed to a final target rotation speed). The prevention or reduction of undershoot conditions may facilitate improvements in aircraft landing safety by reducing a possible loss of thrust (e.g., propulsor speed reduction) following a sudden increase in gas turbine engine loading (sometimes referred to as "rotor droop") during an aircraft landing flare maneuver.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
    a propulsor configured for rotation about a rotational axis;
    an engine including a rotor coupled with the propulsor, the rotor is configured to drive rotation of the propulsor about the rotational axis;
    an electrical distribution system including an electric motor, the electric motor is coupled with the propulsor, and the electric motor and the rotor are configured to cooperatively control rotation of the propulsor about the rotational axis by applying a total torque to the propulsor, the total torque including a motor torque of the electric motor and an engine torque of the rotor; and
    a controller including a processor in communication with a non-transitory memory storing instructions, which instructions when executed by the processor, cause the processor to:
        identify a target rotation speed for the propulsor;
        identify a deviation of an actual rotation speed of the propulsor from the identified target rotation speed while the rotor is driving rotation of the propulsor, the deviation comprising an overshoot or an undershoot;
        change a target total torque for the propulsor to reduce the deviation of the actual rotation speed from the identified target rotation speed;
        control the engine to change an actual engine torque of the rotor to the target total torque;
        while controlling the engine to change the actual engine torque of the rotor to the target total torque, identify a torque difference between the actual engine torque and the target total torque, determine a target motor torque such that the target motor torque is equal to the identified torque difference, and control the electric motor to apply the target motor torque to the propulsor based on the torque difference, and the target motor torque comprises a positive torque or a negative torque.

2. The assembly of claim 1, wherein the identified target rotation speed includes a constant target rotation speed.

3. The assembly of claim 2, wherein the propulsor is a propeller including a plurality of variable-pitch propeller blades.

4. The assembly of claim 1, wherein the identified target rotation speed includes an initial target rotation speed and a final target rotation speed, and the final target rotation speed is different than the initial target rotation speed.

5. The assembly of claim 4, wherein the final target rotation speed is greater than the initial target rotation speed.

6. The assembly of claim 1, wherein:
    the deviation is the undershoot; and
    the target motor torque is the positive torque.

7. The assembly of claim 1, wherein:
    the deviation is the overshoot; and
    the target motor torque is the negative torque.

8. The assembly of claim 1, wherein the instructions, when executed by the processor, further cause the processor to:
    identify at least one limiting parameter of the engine;
    control an engine power of the engine to stay within the at least one limiting parameter; and
    identify the deviation of the actual rotation speed of the propulsor from the identified target rotation speed as the engine power changes within a maximum rate of power change based on the at least one limiting parameter.

9. The assembly of claim 1, wherein the electrical distribution system includes a battery, and the battery is connected in electrical communication with the electric motor.

10. The assembly of claim 1, wherein the identified target rotation speed includes a tolerance and the instructions, when executed by the processor, further cause the processor to:
    identify the deviation of the actual rotation speed of the propulsor from the identified target rotation speed when the actual rotation speed is outside of a tolerance for the identified target rotation speed.

11. A method for controlling a propulsor for a hybrid-electric aircraft propulsion system, the method comprising:
    driving the propulsor at a target total torque to rotate about a rotational axis with an engine of the hybrid-electric aircraft propulsion system;
    identifying a target rotation speed for the propulsor;
    identifying a deviation of an actual rotation speed of the propulsor from the identified target rotation speed, the deviation of the actual rotation speed of the propulsor from the identified target rotation speed comprising an undershoot or an overshoot;
    changing the target total torque to reduce the deviation of the of the actual rotation speed from the identified target rotation speed;
    controlling the engine to change an actual engine torque of the rotor to the target total torque; and
    controlling the propulsor by identifying a torque difference between the actual engine torque and the target total torque while controlling the engine to change the actual engine torque of the rotor to the target total torque, and controlling an electric motor to apply a target motor torque to the propulsor with the target motor torque corresponding to the identified torque difference, the target motor torque comprising a positive torque or a negative torque.

12. The method of claim 11, further comprising changing the target rotation speed and identifying the deviation of the actual rotation speed of the propulsor from the target rotation speed as the target rotation speed changes.

13. The method of claim 11, further comprising controlling an engine power of the engine based on a maximum rate of power increase while controlling the engine to change the actual engine torque of the rotor to the target total torque.

14. The method of claim 11, wherein:
    the target motor torque comprises a positive torque when the deviation of the actual rotation speed of the propulsor from the identified target rotation speed is an undershoot; and
    the target motor torque comprises a negative torque when the deviation of the actual rotation speed of the propulsor from the identified target rotation speed is an overshoot.

15. An assembly for an aircraft propulsion system, the assembly comprising:

a propulsor configured for rotation about a rotational axis;
a gas turbine engine including a bladed turbine rotor and a shaft connected to the bladed turbine rotor, the shaft is coupled with the propulsor, the bladed turbine rotor is configured to drive rotation of the propulsor about the rotational axis with the shaft;
an electrical distribution system including an electric motor, the electric motor and the bladed turbine rotor are configured to cooperatively control rotation of the propulsor about the rotational axis by applying a total torque to the propulsor, the total torque including a motor torque of the electric motor and an engine torque of the bladed turbine rotor; and
a controller including a processor in communication with a non-transitory memory storing instructions, which instructions when executed by the processor, cause the processor to:
identify a target rotation speed for the propulsor;
identify at least one limiting parameter of the gas turbine engine;
control an engine power of the gas turbine engine to stay within the at least one limiting parameter;
identify a deviation of an actual rotation speed of the propulsor from the identified target rotation speed for the propulsor as the engine power changes within a maximum rate of power exchange based on the at least one limiting parameter;
change a target total torque for the propulsor;
control the gas turbine engine to change an actual engine torque of the bladed turbine rotor to the target total torque; and
while controlling the gas turbine engine to change the actual engine torque of the bladed turbine rotor to the target total torque, identify a torque difference between the actual engine torque and the target total torque and control the electric motor to apply a target motor torque to the propulsor with the target motor torque corresponding to the identified torque difference.

* * * * *